United States Patent
Wang

(10) Patent No.: US 9,479,499 B2
(45) Date of Patent: Oct. 25, 2016

(54) METHOD AND APPARATUS FOR IDENTITY AUTHENTICATION VIA MOBILE CAPTURING CODE

(71) Applicant: Tencent Technology (Shenzhen) Company Limited, Shenzhen, Gaungdong (CN)

(72) Inventor: Mingliang Wang, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 98 days.

(21) Appl. No.: 14/204,470

(22) Filed: Mar. 11, 2014

(65) Prior Publication Data
US 2014/0289508 A1  Sep. 25, 2014

Related U.S. Application Data

(63) Continuation of application No. PCT/CN2013/087950, filed on Nov. 27, 2013.

(30) Foreign Application Priority Data

Mar. 21, 2013  (CN) .......................... 2013 1 0091390

(51) Int. Cl.
H04L 29/06  (2006.01)

(52) U.S. Cl.
CPC ......... *H04L 63/0853* (2013.01); *H04L 63/108* (2013.01); *H04L 63/18* (2013.01)

(58) Field of Classification Search
CPC .................................................. H04L 63/0853
See application file for complete search history.

(56) References Cited

U.S. PATENT DOCUMENTS

2012/0240204 A1* 9/2012 Bhatnagar et al. ............... 726/5
2013/0124855 A1* 5/2013 Varadarajan et al. ........ 713/155
(Continued)

FOREIGN PATENT DOCUMENTS

CN  1777101  5/2006
CN  101211357  7/2008
(Continued)

OTHER PUBLICATIONS

QRCodeStickers.org, Encrypted QR Codes and Parts of a QR Code, Apr. 2012.*
(Continued)

*Primary Examiner* — Saleh Najjar
*Assistant Examiner* — Louis Teng
(74) *Attorney, Agent, or Firm* — Brinks Gilson & Lione

(57) ABSTRACT

A method, client device and system of identity authentication are provided. The method may include detecting a login or registration operation, to a server, via a login interface on a user interface of an application client. In response, identity information and an identifier of the application client may be determined. The identity information and the identifier may be encoded into a code displayed on the application client. A mobile terminal may obtain and decode the code to obtain the encapsulated identity information and the identifier. The mobile terminal may also have access to information about an account registered with the authentication server in advance. The mobile terminal may send the identity information, the identifier, and account information to the authentication server for authentication. The application client may then receive an authentication result from the authentication server enabling the user to access the third party service.

19 Claims, 11 Drawing Sheets

(56) References Cited

U.S. PATENT DOCUMENTS

| | | | | |
|---|---|---|---|---|
| 2013/0326584 | A1* | 12/2013 | Du et al. | 726/3 |
| 2014/0223175 | A1* | 8/2014 | Bhatnagar | G09C 5/00 |
| | | | | 713/159 |
| 2014/0230039 | A1* | 8/2014 | Prakash et al. | 726/9 |
| 2015/0089591 | A1* | 3/2015 | Harris | 726/4 |

FOREIGN PATENT DOCUMENTS

| CN | 102868696 | 1/2013 | | |
|---|---|---|---|---|
| EP | EP 2128781 A1 * | 12/2009 | | G06F 21/33 |
| FR | WO 2015044596 A1 * | 4/2015 | | H04L 65/1016 |

OTHER PUBLICATIONS

International Search Report, dated Jan. 23, 2014, pp. 1-3, International Patent Application No. PCT/CN2013/087950, State Intellectual Property Office, Beijing, China.

* cited by examiner

METHOD AND APPARATUS FOR IDENTITY AUTHENTICATION VIA MOBILE CAPTURING CODE

CROSS REFERENCE TO RELATED APPLICATION

This application is a Continuation Application of PCT Application No. PCT/CN2013/087950 filed on Nov. 27, 2013, which claims the benefit of priority to Chinese Patent Application No. 201310091390.3, entitled "METHOD, CLIENT AND SYSTEM OF IDENTITY AUTHENTICATION FOR THIRD PARTY SERVICE", filed on Mar. 21, 2013 with State Intellectual Property Office of PRC, both of which are incorporated herein by reference in their entireties.

FIELD OF THE DISCLOSURE

The present disclosure relates to the technical field of computer networks, and in particular to identity authentication.

BACKGROUND OF THE DISCLOSURE

Generally, before logging in to a website a user may have to go through a registration process. During the registration, the user may be prompted to enter, or input, a user account and a password along with personal information, such as name, telephone number, e-mail and postal address. For registering on different websites, the user may be asked to input the user account, the password and the personal information repeatedly, on each of the different websites. Further, the user may have to remember the usernames and the passwords for the different websites, and also have to input the usernames and the passwords manually for login at each of the different websites. The login process may include opening a login interface, inputting a user account and a password, submitting the account and the password to a server, and completing the login once authenticated by the server.

Such login procedure may have at least the following disadvantages. For logging in on different websites, it may be tedious for the user to input the personal information repeatedly during the registration. Also, if the same password is used for all the websites, the security of the personal information on other websites will be affected once the password is cracked, or hacked, or somehow loses protection on any one website. Further, if different passwords are used, the information to be remembered may be too much, resulting in inconvenience to the user.

SUMMARY OF THE DISCLOSURE

The disclosure provides a method, client device and system of identity authentication. The login and/or registration process of a third party service may be achieved for a mobile terminal by scanning a code displayed on a client. The possibly inconvenient operations of registration and login for different websites may be avoided; and different third party services may be used with only one login account. Thus, the operations may be simplified.

In one aspect of the disclosure, a method of identity authentication is provided, which includes at least the following steps.

An application client may detect a login or registration operation being performed via a login interface on a user interface of the application client. The application client may perform such detection by monitoring user-input events.

The application client may, in response, determine, or obtain identity information and an identifier of the application client. The identifier may be assigned to the application client by an authentication server and the identifier may be associated with a third party service. The identifier may be a unique character string, or any other form of identification assigned to the application client by the authentication server with respect to the third party service. The third party service may be a third party login service running on the application client.

The method may further involve encoding, by the application client, the identity information and the identifier into a code. The method may further include displaying the code on the user interface of the application client. A mobile terminal may obtain the code, by for example capturing the code via a camera or scanning via an infra-red scanner or the like. The mobile terminal may decode the code to obtain the identity information and the identifier. The mobile terminal may also have access to account information which may be obtained by registering on the authentication server in advance. The mobile terminal may send, to the authentication server, the identity information and identifier of the application client and the account information of the mobile terminal together for authentication.

The method may further involve receiving, by the application client, an authentication result from the authentication server.

In another aspect, an application client is provided, which may include at least an operation detecting module, an identity information obtaining module, a code generating module, and an authentication result receiving module.

The operation detecting module may detect a login or registration operation being performed via a login interface on a user interface of the application client.

The identity information obtaining module may, in response to the above detection, obtain identity information and identifier of the application client. The identifier may be assigned to the application client by an authentication server and the identifier may be associated with a third party service, such as a third party login service.

The code generating module may encode, or encapsulate the identity information and the identifier into a code. The code may be displayed on the user interface of the application client such that a mobile terminal may obtain the code by scanning the code. The mobile terminal may decode the code to obtain the identity information and the identifier. The mobile terminal may have stored, or may remotely access, account information which is registered on the authentication server in advance. The account information may be specific to the mobile terminal. The mobile terminal may further send the identity information, the identifier, and the account information to the authentication server for authentication.

The authentication result receiving module of the application client may receive an authentication result from the authentication server.

In yet another aspect, an identity authentication system is provided, which may include an authentication server, a mobile terminal and the above described application client.

The embodiments of the disclosure may have at least the following advantages.

According to the disclosure, the application client is assigned with an identifier associated with a third party service by registering on the authentication server. The application client may obtains the identity information of the application client including the IP address or the network card address. The application client further may encode the identifier and the identity information into a code, and may display the code so that the mobile terminal obtains the code. The mobile terminal may decode the identifier and the identity information of the application client from the code. The mobile terminal may have access to account information which is registered on the authentication server in advance. The mobile terminal may send the identifier and identity information of the application client along with the account information to the authentication server for authentication. If the authentication is successful, the authentication server may send an authorization instruction to the application client. The authorization instruction may indicate that the login or registration operation may be performed through the login interface. By scanning the code using the mobile terminal, the user may, thus, login via the application client to use the third party service. Thus, the tedious process of registering and inputting the user account and the password via the application client may be omitted, and the operation, thus, simplified.

BRIEF DESCRIPTION OF THE DRAWINGS

In order to illustrate the technical solutions according to the embodiments of the present disclosure more clearly, drawings to be used in the description of the embodiments are described briefly below. Apparently, the drawings described hereinafter are only some embodiments, and other drawings may be obtained by those skilled in the art according to these drawings without creative labor.

DETAILED DESCRIPTION

Hereinafter, the technical solutions in the embodiments of the present disclosure will be described clearly and completely in conjunction with the drawings. Obviously, the described embodiments are only few of the possible embodiments. All the other embodiments obtained by those skilled in the art based on the embodiments in the present disclosure without creative labor fall within the scope of protection of the present disclosure.

Figure 1:
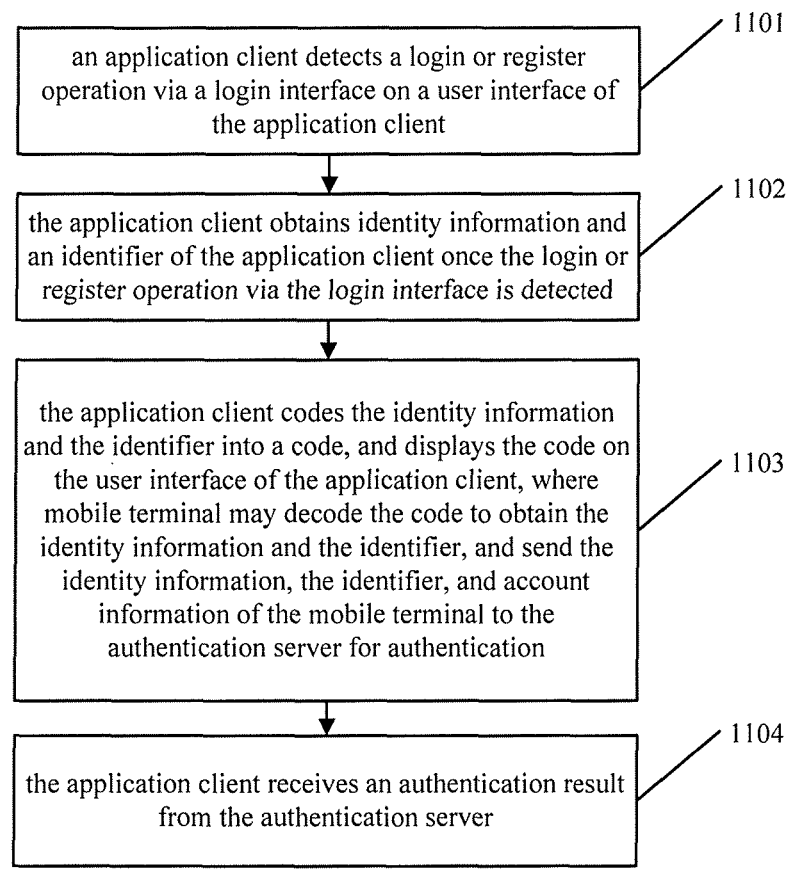
FIG. 1 is a schematic flow chart of a method of identity authentication according to an embodiment of the disclosure.

FIG. 1, illustrates a schematic flow chart of a method of identity authentication according to an embodiment of the disclosure. The method may include at least the following steps 1101 to 1104.

In step S1101, an application client may detect a login or registration operation via a login interface on a user interface of the application client.

As used here, the term "application client" refers to an entity which may communicate with one or more entities over a network. The communication may involve wired or wireless network such as Ethernet, WiFi, 3G, 4G, EDGE, or any other communication network. The application client may be a user terminal with computing capabilities such as a personal computer, a work station computer, a server computer, a tablet, a smart phone, a mobile phone, or any other computing device. In some embodiments, the application client may be software, hardware, firmware or any combination thereof which may execute instructions to implement any of the method steps according to the disclosure.

In step S1102, the application client may obtain identity information and an identifier of the application client once the login or registration operation via the login interface is detected. The identifier may be assigned to the application client by an authentication server. The identifier may further be associated with a third party service.

In step S1103, the application client may encode the identity information and the identifier into a code. The code may be displayed on the user interface of the application client.

The code may be a barcode, a two dimensional code, such as QR code, DataMatrix, Vericode, or any combination thereof, or any code available to convey information. The form of the code does not limit the embodiments of the disclosure.

A mobile terminal may obtain the code, for example by capturing the code with a camera, or by a sensor such as an infra-red sensor or any other sensor capable of capturing the code. The mobile terminal may decode the captured code to obtain the identity information and the identifier. The mobile terminal may further send the identity information, the identifier, and account information of the mobile terminal to the authentication server for authentication. The account information may be registered on the authentication server in advance. The account information may be stored in the mobile terminal or may be stored remotely.

In step S1104, the application client may receive an authentication result from the authentication server.

With this method, the user, who desires to access the third party service and, for that reason, may desire to register or login via the login interface on the application client, may capture with a mobile terminal the code displayed on the application client and thereby obtain the identity information and the identifier associated with the third party service from the code. Thereafter, the account information of the mobile terminal, together with the identity information and the identifier of the application client, may be sent to the authentication server for authentication. Hence, for any third party service, the account information, which was registered on the authentication server, may be used; and the user may not have to perform the registration and/or login operation manually.

Figure 2:
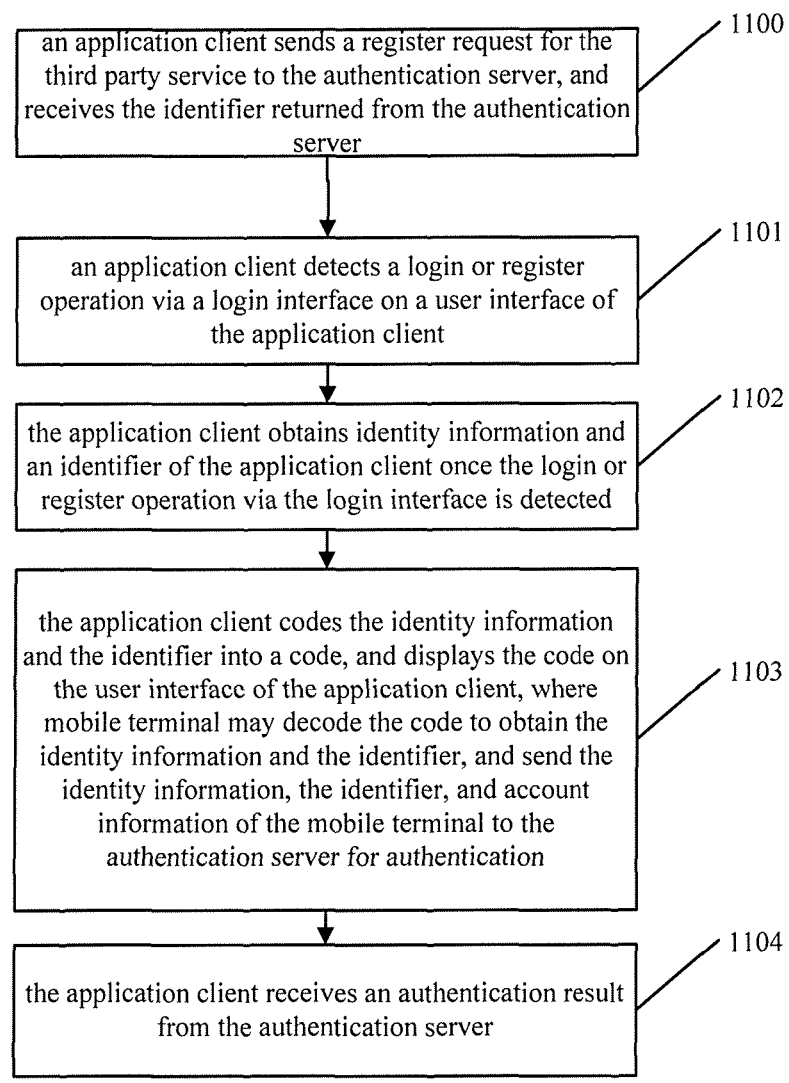
FIG. 2 is a schematic flow chart of a method of identity authentication according to another embodiment of the disclosure.

FIG. 2 is a schematic flow chart of a method of identity authentication according to another embodiment of the disclosure. As shown in FIG. 2, the method may further include the step 1100 of sending, by the application client, a registration request for the third party service to the authentication server, and receiving the identifier returned from the authentication server.

Figure 3:
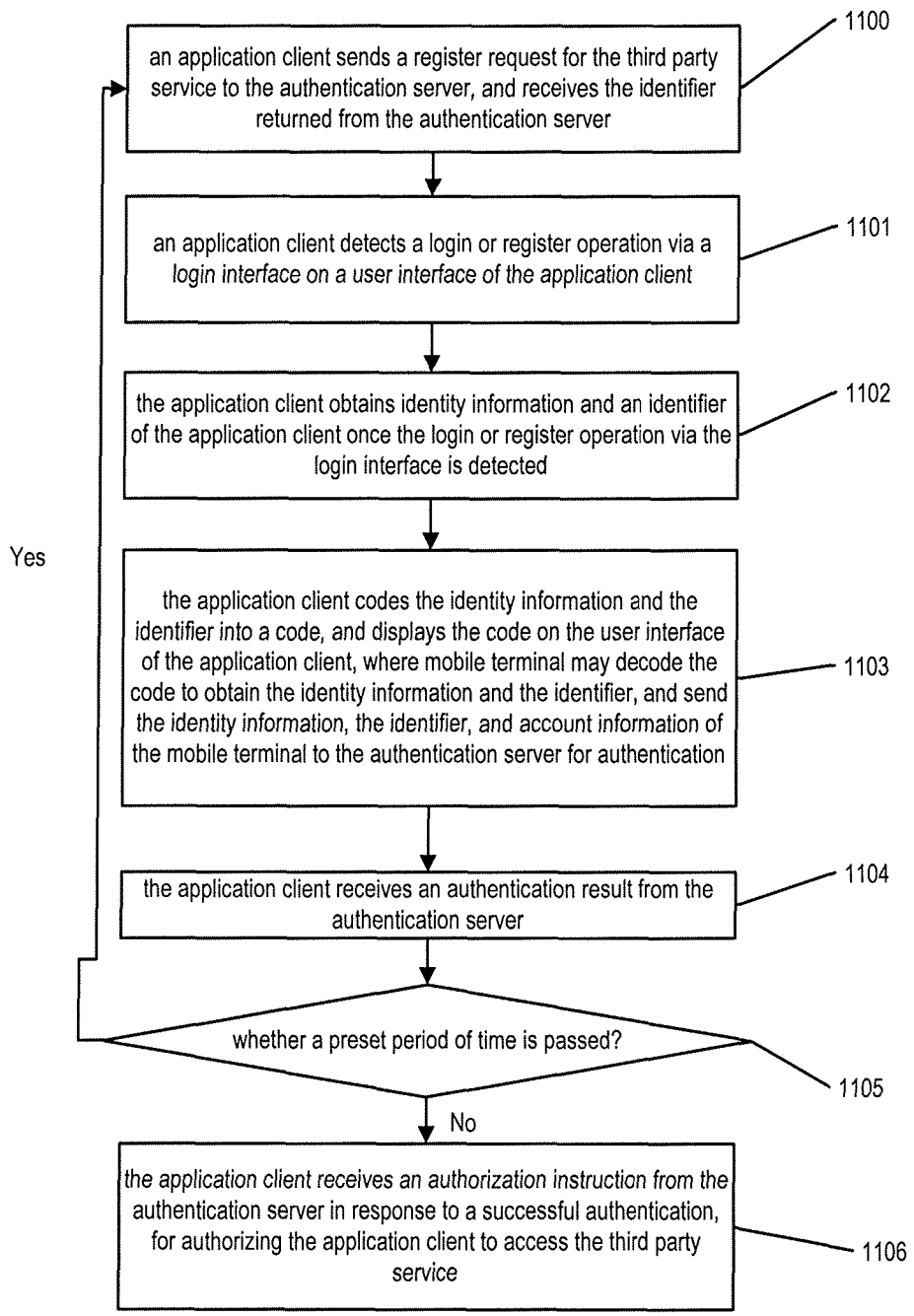
FIG. 3 is a schematic flow chart of a method of identity authentication according to yet another embodiment of the disclosure.

FIG. 3 is a schematic flow chart of a method of identity authentication according to another embodiment of the disclosure. As shown in FIG. 3, the method may further include the step 1106 of receiving, by the application client, an authorization instruction from the authentication server in response to a successful authentication. The authorization instruction may authorize the user to access the third party service via the application client.

As shown in FIG. 3, in another embodiment, the application client may detect (S1105) whether a preset period of time is passed before the authorization instruction is received. If the authorization instruction is not received in the preset period of time, the application client may resend a registration request for the third party service to the authentication server. In this way, the code, generated as described earlier, may be updated regularly and thus, enhance the security.

Figure 4:
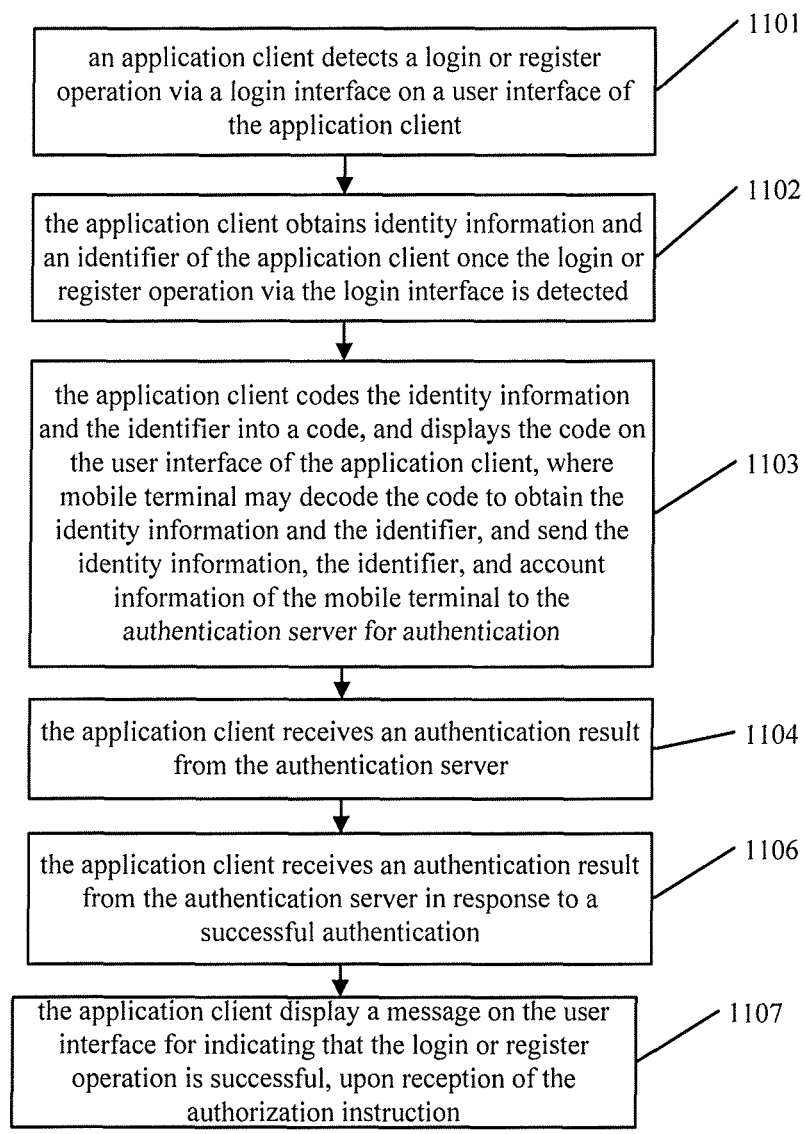
FIG. 4 is a schematic flow chart of a method of identity authentication according to yet another embodiment of the disclosure.

According to yet another embodiment, the method may further include the step 1107 as shown in FIG. 4. Step 1107 may involve displaying, by the application client, a message on the user interface for indicating that the login or registration operation was successful. Such a message may be displayed upon receipt of the authorization instruction.

Figure 5:
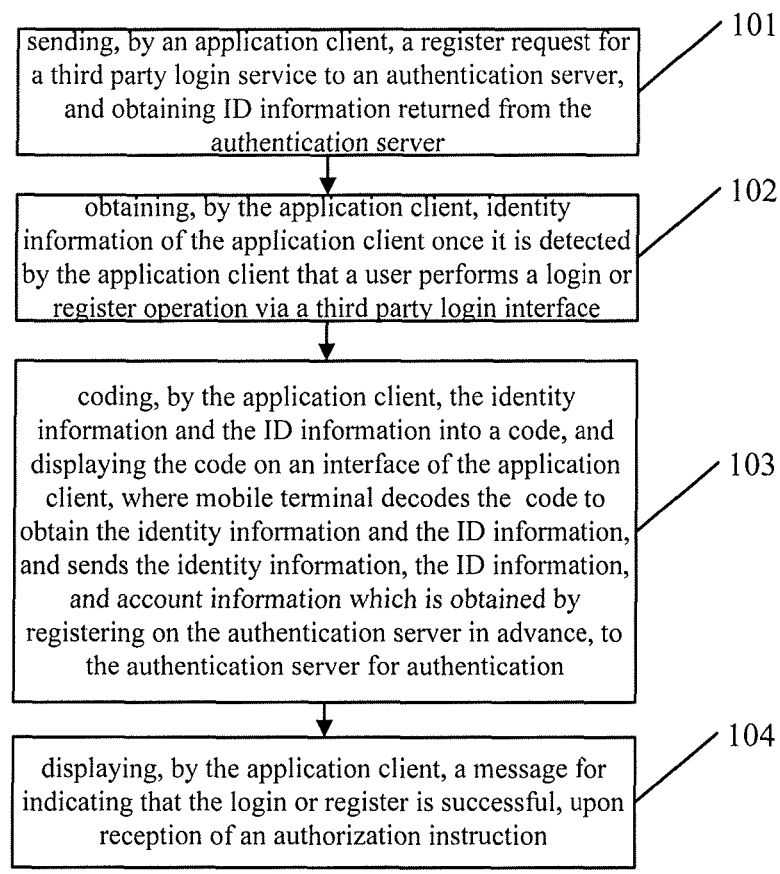
FIG. 5 is a schematic flow chart of a method of identity authentication according to yet another embodiment of the disclosure

FIG. 5 illustrates a schematic flow chart of a method of identity authentication according to another embodiment of the disclosure. The method may include at least the following steps 101 to 104.

In Step 101, an application client may send a registration request for a third party login service to an authentication server. The application client may further receive ID (identifier) information returned from the authentication server.

The third party service may run, or be executing, on the application client. The third party service may be registered on the authentication server in advance. The ID (identifier) associated returned to the application client may be associated with the third party service executing on the application client.

As an example, assuming that the third party service is a telecommunication access service, and the authentication server is a server. The application client, on which the telecommunication access service executes, may send the registration request to the server. Upon successful registration, the server may assign a unique ID, such as a character string, to the application client. The ID information may be associated with the third party telecommunication access service.

In Step 102, the application client, may obtain identity information of the application client if the application client detects that a login or registration operation is being performed via a third party login interface.

Continuing the above example in which the third party service is a telecommunication access service and the authentication server is, for example, a server, the application client may detect that the user is using the telecommunication access service to perform a login or registration operation. The application client may detect this based on a third party login interface on the user interface of the application client. The user may, for example, login to the telecommunication server by using an account on the server. The application client, in this case, may obtain the identity information of the application client itself, such as an IP address or a network card address, or any other unique identifier that may be associated with the application client.

In Step 103, the application client, may codify, or encode, the identity information and the ID information into a code. The identity information may be that of the application client, while the ID information may be assigned to the application client by the authentication server associated with the third party login service. The application client may further display the code on an interface of the application client.

A mobile terminal may obtain or capture the code. The mobile terminal may decode the code to obtain the identity information and the ID information, and may further send the identity information, the ID information, and account information to the authentication server for authentication. The account information may be obtained by the mobile terminal by registering on the authentication server in advance.

Step 104 may involve displaying, by the application client, a message on the user interface for indicating that the login or register is successful, upon receipt of an authorization instruction from the authentication server in response to a successful authentication.

According to the disclosure, the application client may obtain the ID information by registering on the authentication server. The application client may further obtain the identity information of the application client, such as the IP address and the network card address. The application client may then encode the ID information and the identity information into a code. The mobile terminal may obtain the code and decode the code to obtain the contained information. The mobile terminal may have account information obtained by registering on the authentication server in advance. The mobile terminal may then send the ID information and the identity information of the application client, obtained by decoding the code, together with the account information, obtained in advance, to the authentication server for authentication. If the authentication is successful, the authentication server may send an authorization instruction to the application client. The authorization instruction may indicate that the login or registration may be performed through a third party login interface. By scanning the code using the mobile terminal, the user may login via the third party login interface to use the third party service. The tedious process of registering and inputting the user account and the password via the application client may be omitted, and thus the operation is simplified.

Figure 6:
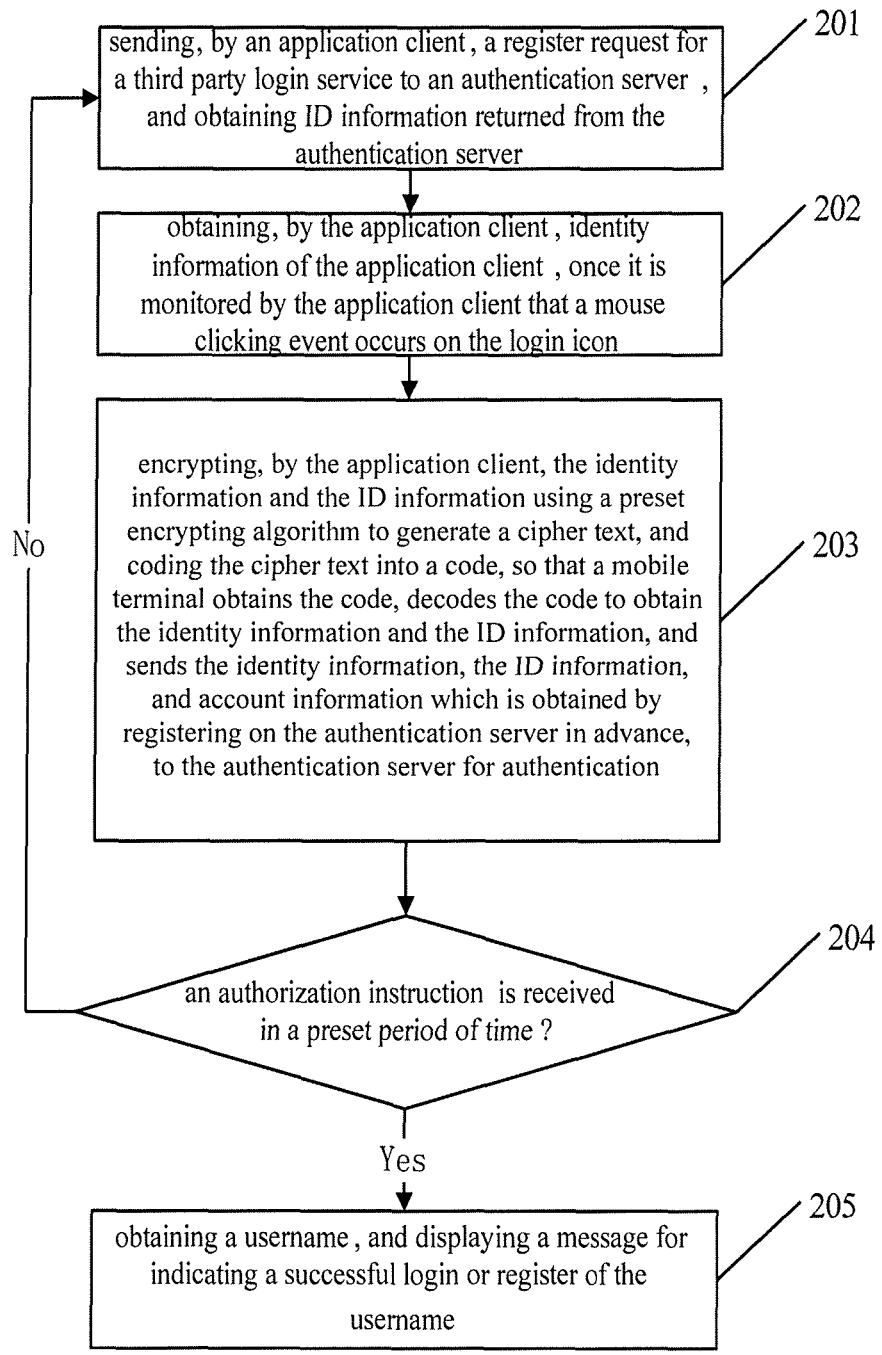
FIG. 6 is a schematic flow chart of a method of identity authentication according to yet another embodiment of the disclosure

FIG. 6 is another schematic flow chart of a method of identity authentication according to an embodiment of the disclosure. The method includes at least the following steps 201 to 205.

Step 201 may involve sending, by an application client, a registration request for a third party login service to an authentication server. The application client, in response, may obtain ID information returned from the authentication server.

The third party login service that runs on the application client may register on the authentication server in advance. Assuming that the third party service is a telecommunication access service, and the authentication server is a server, the application client on which the telecommunication access service is executing, may send a request to register to the server. Upon a successful registration, the server may assign ID information, such as a unique character string, to the application client.

Step 202 may involve obtaining, by the application client, identity information of the application client. The identity information may be obtained in response to monitoring of user-input events that may occur on a login interface. The application client may monitor mouse events, such as mouse clicks occurring on the login interface as part of such monitoring. Touch-sensitive user inputs, key-presses on a keyboard, button clicks on a trackpad, button clicks on a stylus may be other user-input events that may be monitored in this regard.

The application client may encrypt the identity information and ID information using a preset encryption algorithm. The encryption algorithm may be a Hash algorithm or any other encryption algorithm. The present disclosure is not limited by the type of encryption algorithm used. The application client and the mobile terminal may have agreed on the encryption algorithm for facilitating the subsequent decryption operation. The application client may encode the encrypted cipher text into a code. The mobile terminal, in turn, may decode the code and further perform decryption using the agreed decryption algorithm to obtain the ID information and identity information of the application client. The mobile terminal may be registered on the authentication server, such as the server, and thereby, may have account information assigned by the authentication server. The account information may be saved on the mobile terminal or at a remotely accessible location. The mobile terminal may send the ID information, the identity information and the account information together to the authentication server. The authentication server may authenticate, using information from a database, whether the ID information of the application client and the account information of the mobile terminal are correct. If the ID information of the application client and the account information of the mobile terminal are correct, the authentication server may send an authorization instruction for indicating the third party login to the application client. The authentication server forwards the authorization instruction to the application client based on the identity information.

Step 203 may involve encrypting, by the application client, the identity information and the ID information. The application client may use a preset encrypting algorithm for this purpose. Thereby, the application client may generate a cipher text. The application client may further encode the cipher text into a code. A mobile terminal may obtain the code by scanning or capturing the code. The mobile terminal may decode the code to obtain the identity information and the ID information. The mobile terminal may register on the authentication server in advance and obtain an account on the authentication server. The registration of the mobile terminal may have been performed in advance. The mobile terminal may then send the decoded identity information, and the ID information, along with the account information, to the authentication server for authentication.

The application client may encrypt the identity information and ID information using a preset encryption algorithm. The encryption algorithm may be the Hash algorithm or any other encryption algorithm. The present disclosure is not limited by the type of encryption algorithm used. The application client and the mobile terminal may have agreed on the encryption algorithm for facilitating the subsequent decryption operation. The application client may encode the encrypted cipher text into a code. The mobile terminal, in turn, may decode the code and further perform decryption using the agreed decryption algorithm to obtain the ID information and identity information of the application client. The mobile terminal may be registered on the authentication server, such as the server, and thereby, may have account information assigned by the authentication server. The account information may be saved on the mobile terminal or at a remotely accessible location. The mobile terminal may send the ID information, the identity information and the account information together to the authentication server. The authentication server may authenticate, using information from a database, whether the ID information of the application client and the account information of the mobile terminal are correct. If the ID information of the application client and the account information of the mobile terminal are correct, the authentication server may send an authorization instruction for indicating the third party login to the application client. The authentication server forwards the authorization instruction to the application client based on the identity information.

Step 204 may involve determining whether an authorization instruction sent from the authentication server in response to a successful authentication is received at the application client in a preset period of time.

If the application client receives the successful authorization instruction sent from the authentication server in the preset period of time, the method may proceed to step 205. If the application client does not receive the authorization instruction sent from the authentication server in the preset period of time, the application client may resend a registration request to the authentication server. By updating the code regularly, the security of the system may be improved.

Step 205 may involve obtaining a username contained in the account information of the mobile terminal, and displaying a message on the user interface for indicating a successful login or registration of the username.

Upon receipt of the authorization instruction sent from the authentication server in response to a successful authentication, the application client may obtain the username contained in the account information of the mobile terminal. The username may have been obtained by the mobile terminal from the authentication server in advance. For example, in case of a server and account, upon receipt of the authentication instruction sent from the server, the application client may obtain the username, such as the QQ account number, from the account information of the mobile terminal. The mobile terminal may have obtained the QQ account number in advance by access to the server. The application client may then display, on the user interface of the application client, a message which indicates that the QQ account information was successfully used to login or register into the telecommunication service.

According to the disclosure, the application client may obtain ID information by registering on the authentication server. The application client may further obtain the identity information of the application client including, such as the IP address and the network card address. The application client may also encode the ID information and the identity information into a code that the mobile terminal may scan or capture. The mobile terminal may determine the ID information and the identity information of the application client by decoding the scanned code. The mobile terminal may also access to the account information which is registered on the authentication server in advance. The mobile terminal may then send the decoded ID information and identity information along with the account information to the authentication server for authentication. If the authentication is successful, the authentication server may send an authorization instruction to the application client. The authorization instruction may indicate that the login or registration may be performed through a third party login interface. Thus, by scanning the code using the mobile terminal, the user may login via the third party login interface and use the third party service. The tedious process of registering and inputting the user account and the password via the application client may thus be omitted, and the operation may be simplified.

Figure 7:
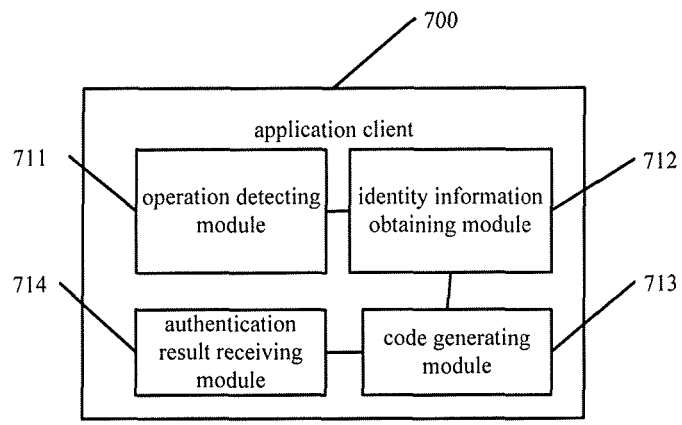
FIG. 7 is a schematic structural diagram of an application client according to an embodiment of the disclosure.

An application client according to an embodiment is provided in FIG. 7. Referring to FIG. 7, the application client 700 may include an operation detecting module 711, an identity information obtaining module 712, a code generating module 713, and an authentication result receiving module 714.

The operation detecting module 711 may detect a login or registration operation being performed via a login interface on an user interface of the application client.

The identity information obtaining module 712 may obtain, or determine, identity information and an identifier of the application client once the login or registration operation via the login interface is detected. The identifier may be assigned to the application client by an authentication server and may be associated with a third party service.

The code generating module 713 may encode the identity information and the identifier into a code. The code may be displayed on the user interface of the application client. A mobile terminal may obtain the code, such as by scanning or capturing the code by a camera or any other sensor input mechanism. The mobile terminal may decode the code to obtain the identity information and the identifier. The mobile terminal may further have access to account information registered on the authentication server in advance. The mobile terminal may send the identity information, the identifier information, and the account information to the authentication server for authentication.

The authentication result receiving module 714 may receive an authentication result from the authentication server.

Figure 8:
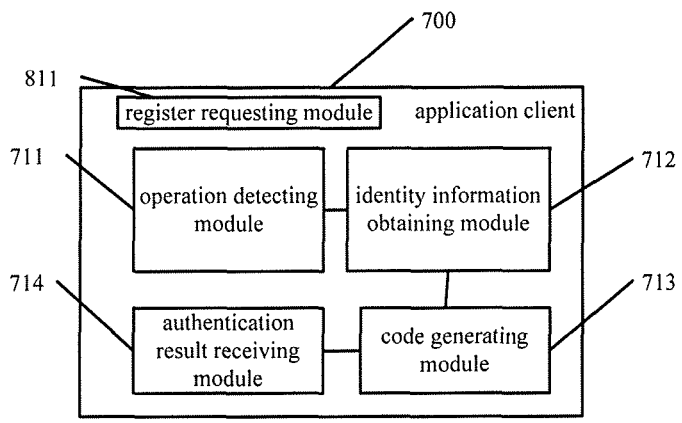
FIG. 8 is a schematic structural diagram of an application client according to an embodiment of the disclosure.

In another embodiment, the application client 700 may further include a register requesting module 811, as shown in FIG. 8. The register requesting module 811 may send a request to register the third party service to the authentication server. The register requesting module 811 may also receive the identifier returned from the authentication server.

Figure 9:
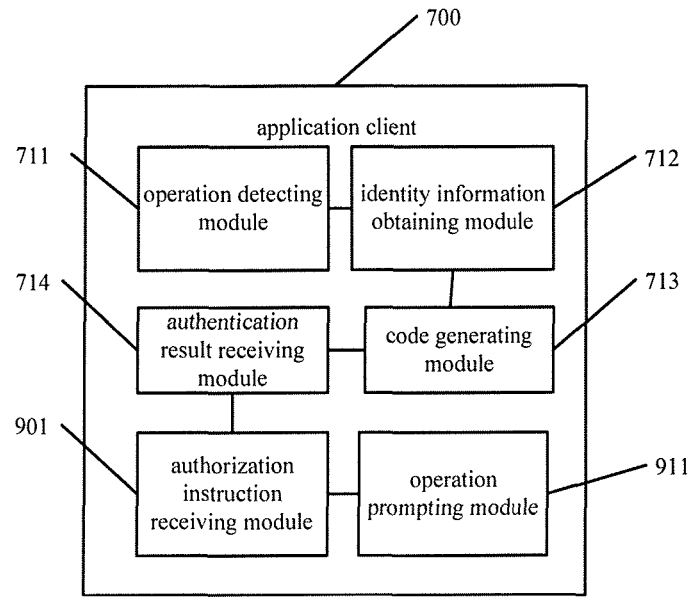
FIG. 9 is a schematic structural diagram of an application client according to an embodiment of the disclosure.

In another embodiment, as shown in FIG. 9, the application client 700 may further include an authorization instruction receiving module 901. The authorization instruction receiving module 901 may receive an authorization instruction from the authentication server in response to a successful authentication. The authorization instruction may indicate an authorization for the application client to access the third party service.

In yet another embodiment, shown in FIG. 9, the application client 700 may further include an operation prompting module 911. The operation prompting module 911 may display a message on the user interface indicating that the login or register operation is successful. Such message may be displayed upon receipt of the authorization instruction from the authentication server.

Figure 10:
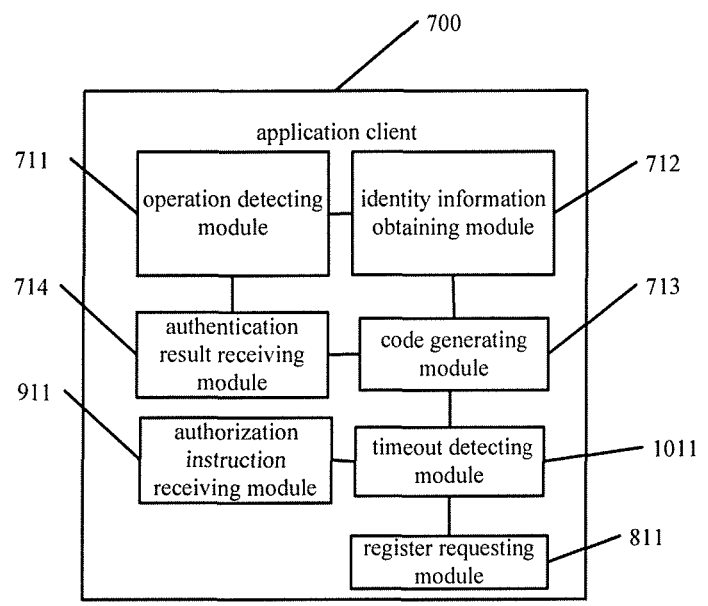
FIG. 10 is a schematic structural diagram of an application client according to an embodiment of the disclosure.

In another embodiment as shown in FIG. 10, the application client 700 may further include a timeout detecting module 1011. The timeout detecting module 1011 may instruct the register requesting module 811 to operate if the authorization instruction is not received in a preset period of time.

Figure 11:
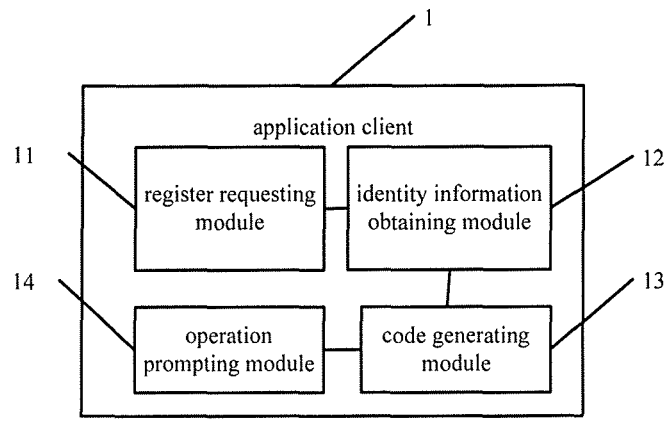
FIG. 11 is a schematic structural diagram of an application client according to an embodiment of the disclosure.

FIG. 11 is a schematic structural diagram of an application client according to an embodiment of the disclosure. The application client may include a register requesting module 11, an identity information obtaining module 12, a code generating module 13 and an operation prompting module 14.

The register requesting module 11 may send a registration request for a third party login service to an authentication server. The register requesting module 11 may further obtain ID information returned from the authentication server.

The register requesting module 11 may register on the authentication server in advance. Assuming that the third party service is a telecommunication access service, and the authentication server is a server, the register requesting module 11 may send a register request to the server. Upon successful registration, the server may assign a unique ID, such as character string, to the application client.

The identity information obtaining module 12 may obtain identity information of the application client. The identity information obtaining module 12 may be triggered when it is detected that a user desires to perform or is in the middle of performing a login or registration operation via a third party login interface.

Taking the above authentication server as an example, when it is detected that the user utilizes the telecommunication access service through the third party login interface on the user interface, the identity information obtaining module 12 may obtain the identity information of the application client, such as an IP address, a network card address, a MAC address or any other unique identification information associated with the application client. Considering the above example involving an authentication server and account, the application client, may detect that the user is logging into the telecommunication server by using the account on the server. In response, the identity information obtaining module 12 may determine the identity information of the application client.

The code generating module 13 may encode, or codify, or encapsulate the identity information and the ID information into a code. The code may be a barcode, a 2D barcode, a high capacity barcode, a stacked barcode, a QR code, or any other form of providing encoded information. The generated code may be displayed on an interface of the application client, so that a mobile terminal may scan or capture the code. The mobile terminal may decode the code to obtain the identity information and the ID information contained within the code. The mobile terminal may further have access to account information which is registered on the authentication server in advance. The identity information, the ID information, and, the account information are sent to the authentication server by the mobile terminal for authentication.

The operation prompting module 14 may display a message on the user interface for indicating that the login or registration is successful. The operation prompting module 14 may display such a message in response to receipt of an authorization instruction sent from the authentication server in response to a successful authentication.

According to the disclosure, the application client obtains, or receives, ID information by registering on the authentication server. The application client may also obtain, or determine, the identity information of the application client, such as the IP address, the network card address or any other identifying information and combination thereof. The application client may further encode the ID information and the identity information into a code. The mobile terminal may obtain the code, by such as scanning, the code. The mobile terminal may send, to the authentication server for authentication, the ID information and the identity information of the application client obtained by decoding the code. The mobile terminal may also send, to the authentication server, the account information which is registered on the authentication server in advance. If the authentication is successful, the authentication server may send an authorization instruction which indicates that the login or registration may be performed through a third party login interface, to the application client. By scanning the code using the mobile terminal, the user can login via the third party login interface to use the third party service. The tedious process of registering and inputting the user account and the password via the application client may be omitted, and the operation may be simplified.

Figure 12:
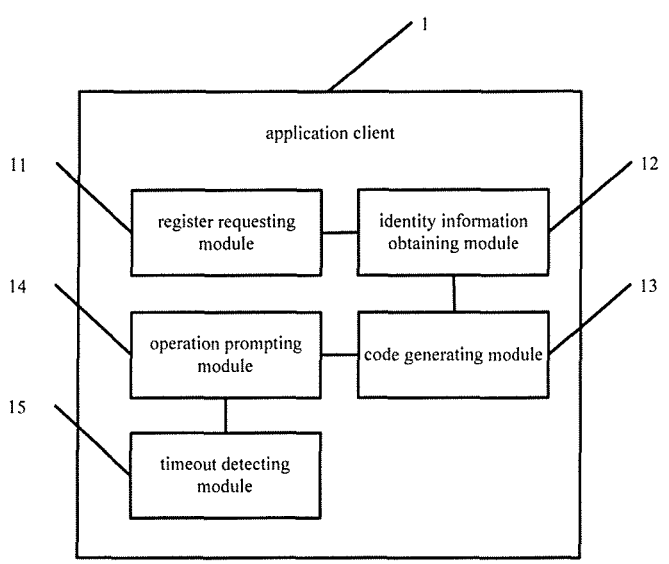
FIG. 12 is another schematic structural diagram of an application client according to an embodiment of the disclosure.

Further, reference is made to FIG. 12, which is a schematic structural diagram of an application client according to an embodiment of the disclosure. The application client may include a timeout detecting module 15 in addition to the register requesting module 11, the identity information obtaining module 12, the code generating module 13 and the operation prompting module 14.

The timeout detecting module 15 may instruct the register requesting module 11 to operate if the authorization instruction sent from the authentication server in response to a successful authentication is not received in a preset period of time.

For example, upon failure to receive the authorization instruction sent from the authentication server in response to a successful authentication in the preset period of time, the timeout detecting module 15 may instruct the register requesting module 11 to resend a registration request to the authentication server. By updating the information of the code regularly, the security of the system may be improved.

Figure 13:
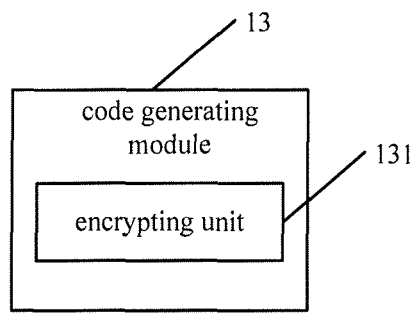
FIG. 13 is a schematic structural diagram of a code generating module according to an embodiment of the disclosure.

Referring to FIG. 13, the code generating module 13 may include an encrypting unit 131.

The encrypting unit 131 may encrypt the identity information and the ID information using a preset encrypting algorithm to generate a cipher text. The encrypting unit 131 may further encode the cipher text into a code.

The encrypting unit 131 may encrypt the identity information and ID information using a preset encryption algorithm. The encryption algorithm may be the Hash algorithm or the like, which is not limited in the disclosure. The application client and the mobile terminal may have agreed on the encryption algorithm for facilitating the subsequent decryption operation by the mobile terminal. The application client may encode the encrypted cipher text into a code as described earlier.

Figure 14:
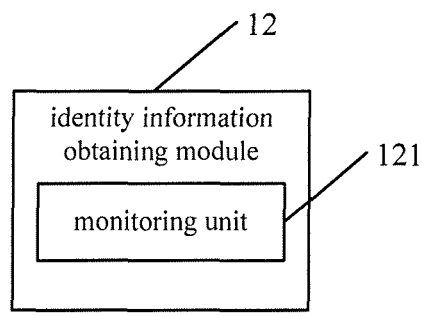
FIG. 14 is a schematic structural diagram of an identity information obtaining module according to an embodiment of the disclosure.

Referring to FIG. 14, the identity information obtaining module 12 may include a monitoring unit 121.

The monitoring unit 121 may monitor user-input events occurring on the login icon. The user-input events may be performed by a pointing device such as a mouse, or in case of a touch sensitive device by a finger, stylus or any other pointing device. The user-input events may also include selections performed using user input devices such as a keyboard, digital pen, or any other user input device. The login icon may be a button, a hyperlink or any other user interface element used in connection with a login process. Based on detection, or monitoring, of the user-input events occurring on the login icon, it may be determined that a user is performing a login or registration operation via a third party login interface. The login icon provided on the user interface of the application client may be contained in the third party login interface.

Figure 15:
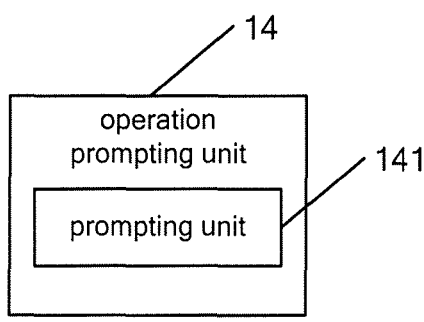
FIG. 15 is a schematic structural diagram of an operation prompting module according to an embodiment of the disclosure.

Referring to FIG. 15, the operation prompting module 14 may include a username obtaining unit 141.

The username obtaining unit 141 may obtain a username contained in the account information of the mobile terminal upon reception of the authorization instruction sent from the authentication server in response to a successful authentication. The operation prompting module 14 may further display a message on the user interface indicating a successful login or registration of a user corresponding to the username.

According to the disclosure, the application client may obtain ID information by registering on the authentication server. The application client may also obtain the identity information of the application client. The identity information may be the IP address, the network card address, or any other unique identification information of the application client or a combination thereof. The application client further may encode or encapsulate the ID information and the identity information into a code. The mobile terminal may obtain and decode the code to obtain the information contained therein. The mobile terminal may store or have access to account information which is registered on the authentication server in advance. The mobile terminal may then send the ID information and the identity information of the application client obtained by decoding together with the, account information to the authentication server for authentication. If the authentication is successful, the authentication server may send an authorization instruction which indicates that the login or register may be performed through a third party login interface, to the application client. By scanning the code using the mobile terminal, the user may login via the third party login interface to use the third party service. The tedious process of registering and inputting the user account and the password via the application client may be omitted, and the operation, thus, simplified.

Figure 16:
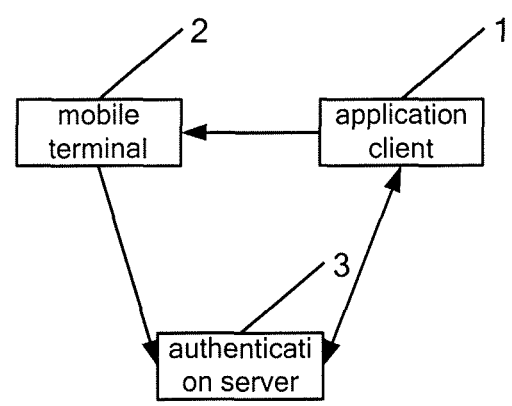
FIG. 16 is a schematic structural diagram of an identity authentication system according to an embodiment of the disclosure.

Reference is made to FIG. 16, which is a schematic structural diagram of an identity authentication system according to an embodiment of the disclosure. The identity authentication system may include a mobile terminal 2, an application client 1 and an authentication server 3. The identity authentication system may operate, for example, as described further.

The application client 1 may send a registration request to the authentication server 3 in advance. The authentication server 3 may assign ID information to the application client 1 after a successful registration. When the user performs a login operation on the application client 1 by using a third party login interface, which may be bonded to the authentication server 3 in advance, the application client 1 may obtains the identity information of the application client itself. Such identity information may be the IP address, the network card address, MAC address or any other unique identification information associated with the application client or a combination thereof. The application client 1 may encode the ID information and the identity information into a code which may be displayed on the user interface of the application client 1. The mobile terminal 2 may capture the code using a camera or any other scanning device. The mobile terminal 2 may decode the code to obtain the ID information and identity information of the application client 1. The mobile terminal 2 may store or have access to the account information which is registered by the mobile terminal 2 on the authentication server 3 in advance. The mobile terminal 2 may then send, together with the identity information and the ID information, the account information to the authentication server 3 for authentication. If the authentication is successful, the authentication server 3 may send out an authorization instruction for authorizing the login via the third party login interface to the application client 1. A message which indicates that the login is successful is displayed on the application client 1 corresponding to the identity information.

According to the disclosure, the application client may obtain ID information by registering on the authentication server. The application client may also obtain the identity information of the application client. The identity information may be the IP address, the network card address, or any other unique identification information of the application client or a combination thereof. The application client further may encode or encapsulate the ID information and the identity information into a code. The mobile terminal may obtain and decode the code to obtain the information contained therein. The mobile terminal may store or have access to account information which is registered on the authentication server in advance. The mobile terminal may then send the ID information and the identity information of the application client obtained by decoding together with the, account information to the authentication server for authentication. If the authentication is successful, the authentication server may send an authorization instruction which indicates that the login or register may be performed through a third party login interface, to the application client. By scanning the code using the mobile terminal, the user may login via the third party login interface to use the third party service. The tedious process of registering and inputting the user account and the password via the application client may be omitted, and the operation thus simplified. It can be understood by those skilled in the art that all or some of the processes for implementing the above methods can be implemented by hardware instructed by a computer program which can be stored in a computer readable storage medium. When executed, the program may implement the processes of the methods. The storage medium may be magnetic disk, optical disk, Read-Only Memory (ROM), Random Access Memory (RAM) and the like.

It can be understood by those skilled in the art that the application client and the method of identity authentication may be implemented by processing units including CPU (central processing unit) or general computing device and storage units including RAM or ROM for storing programs.

Disclosed above are only a few of the possible embodiments, and the scope of the disclosure is not limited thereto. All or some of the processes for implementing the above methods can be understood by those skilled in the art, and the equivalents made in accordance with the claims fall within the scope of the disclosure.

Various embodiments described herein can be used alone or in combination with one another. The foregoing detailed description has described only a few of the many possible implementations of the present disclosure. For this reason, this description of example embodiments is intended by way of illustration, and not by way of limitation. Some modifications and equivalents can be made to the technical solution of the present invention by those skilled in the art in light of the technical content disclosed above without deviation from the scope of the present disclosure. Therefore, any simple change, equivalent alternation and modification made to the above embodiments according to the technical principle of the present disclosure without deviation from the scope of the present disclosure all fall within the scope of protection of the technical solution of the present disclosure. The methods, devices, and logic described above may be implemented in many different ways in many different combinations of hardware, software or both hardware and software.

What is claimed is:

1. A method of identity authentication, comprising:
registering in advance, by an application client device, with an authentication server for a third party service executing on the application client device;
receiving, by the application client device, an identifier assigned by the authentication server in response to the registering, for uniquely identifying the third party service on the application client device;
detecting, by an application client device, a login or registration operation to the third party service, on a login user interface of a user interface of the application client device, after receiving the identifier;
determining, by the application client device, the identifier assigned in advance and identity information of the application client device in response to the detection of the login or registration operation, wherein the identity information uniquely identifies the application client device;
encoding, by the application client device, the identity information and the identifier into a code;
displaying the code on the user interface of the application client device for capture by a mobile terminal, wherein the mobile terminal is configured to obtain the identity information and the identifier by decoding the code and send the identity information, the identifier, and account information of the mobile terminal to the authentication server for authentication, wherein the account information is obtained by registering for the mobile terminal on the authentication server in advance; and
receiving, by the application client device, an authentication result from the authentication server.

2. The authentication method according to claim 1, further comprising:
receiving, by the application client device, an authorization instruction from the authentication server in response to a successful authentication, for authorizing the application client device to access the third party service.

3. The authentication method according to claim 2, further comprising:
displaying, by the application client device, a message on the user interface for indicating that the login or registration operation is successful, in response to the receipt of the authorization instruction.

4. The authentication method according to claim 3, wherein the step of displaying a message on the user interface for indicating that the login or register operation is successful in response to receipt of the authorization instruction comprises:

obtaining a username contained in the account information of the mobile terminal; and displaying the message on the user interface for indicating a successful login or registration of a user corresponding to the username.

5. The authentication method according to claim 2, further comprising:

in response to failure to receive the authorization instruction within a preset period of time, sending, by the application client device, a registration request for the third party service to the authentication server and obtaining the identifier.

6. The authentication method according to claim 1, wherein the step of encoding the identity information and the identifier into the code comprises:

encrypting, by the application client device, the identity information and the identifier using an encrypting algorithm to generate a cipher text; and encoding the cipher text into the code.

7. The authentication method according to claim 1, wherein the login interface comprises a login icon provided on the user interface of the application client device, and the step of detecting a login or registration operation via a login interface comprises monitoring a user-input event on the login icon.

8. The authentication method according to claim 1, wherein the identity information of the application client device comprises an IP address or a network card address of the application client device.

9. The authentication method according to claim 1, wherein determining the identity information of the application client device and the identifier of the application client device comprises locally obtaining the identity information and the identifier stored locally.

10. An application client device, comprising:
a storage having programs stored therein; and
a processor, when executing the programs, configured to:
register in advance with an authentication server for a third party service executing on the application client device;
receive an identifier assigned by the authentication server in response to the registering, for uniquely identifying the third party service on the application client device;
detect a login or registration operation to the third party service on a login user interface of a user interface of the application client device, after receiving the identifier;
determine the identifier assigned in advance and identity information of the application client device in response to the detection of the login or register operation via the login interface, wherein the identity information uniquely identifies the application client device;
encapsulate the identity information and the identifier into a code, wherein the code is displayed on the user interface of the application client device for a mobile terminal to obtain, wherein the mobile terminal decodes the code to obtain the identity information and the identifier, and sends the identity information, the identifier, and account information of the mobile terminal to the authentication server for authentication, wherein the account information is obtained by registering for the mobile terminal on the authentication server in advance; and
receive an authentication result from the authentication server.

11. The application client device according to claim 10, wherein the processor, when executing the programs, is further configured to:

receive an authorization instruction from the authentication server in response to a successful authentication, the authorization instruction authorizing the application client device to access the third party service.

12. The application client device according to claim 11, wherein the processor, when executing the programs, is further configured to:

display a message on the user interface indicating a successful login or registration operation in response to the receipt of the authorization instruction.

13. The application client device according to claim 12, wherein the processor, when executing the programs, is further configured to:

obtain a username contained in the account information of the mobile terminal in response to receipt of the authorization instruction; and include the username in the displayed message.

14. The application client device according to claim 11, wherein the processor, when executing the programs, is further configured to:

resend a registration request for the third party service to the authentication server if the authorization instruction is not received in a preset period of time.

15. The application client device according to claim 10, wherein the processor, when executing the programs, is further configured to:

send a registration request for the third party service to the authentication server, and to receive the identifier from the authentication server, in response to the registration request.

16. The application client device according to claim 10, wherein the processor, when executing the programs, is further configured to:

encrypt the identity information and the identifier using a preset encrypting algorithm to generate a cipher text, wherein the cipher text is encoded into the code.

17. The application client device according to claim 10, wherein the processor, when executing the programs, is further configured to:

monitor a user-input event occurring on the login interface on the application client device.

18. The application client device according to claim 10, wherein the identity information of the application client device comprises an Internet protocol (IP) address or a network card address of the application client device.

19. An identity authentication system, comprising:
an authentication server;
a mobile terminal; and
an application client device;
wherein the application client device comprises:
a storage having programs stored therein; and
a processor, when executing the programs, the processor is configured to:
register in advance with an authentication server for a third party service executing on the application client device;
receive an identifier assigned by the authentication server in response to the registering, for uniquely identifying the third party service on the application client device;

detect an ongoing login or registration operation to the third party service on a login user interface of a user interface of the application client device, after receiving the identifier;

determine the identifier assigned in advance and identity information of the application client device in response to the detection of the login or register operation via the login interface, wherein the identity information uniquely identifies the application client device;

encapsulate the identity information and the identifier into a code, wherein the code is displayed on the user interface of the application client device for a mobile terminal to obtain, wherein the mobile terminal decodes the code to obtain the identity information and the identifier, and sends the identity information, the identifier, and account information of the mobile terminal to the authentication server for authentication, wherein the account information is obtained by registering for the mobile terminal on the authentication server in advance; and receive an authentication result from the authentication server.

* * * * *